Jan. 15, 1924.

C. LE G. FORTESCUE 1,480,711

PHASE CONVERTING SYSTEM

Filed Nov. 16, 1918

2 Sheets-Sheet 1

WITNESSES:

INVENTOR
Charles Le G. Fortescue.
BY
ATTORNEY

Jan. 15, 1924.　　　　　　　　　　　　　　　　　　　1,480,711
C. LE G. FORTESCUE
PHASE CONVERTING SYSTEM
Filed Nov. 16, 1918　　　　　2 Sheets-Sheet 2
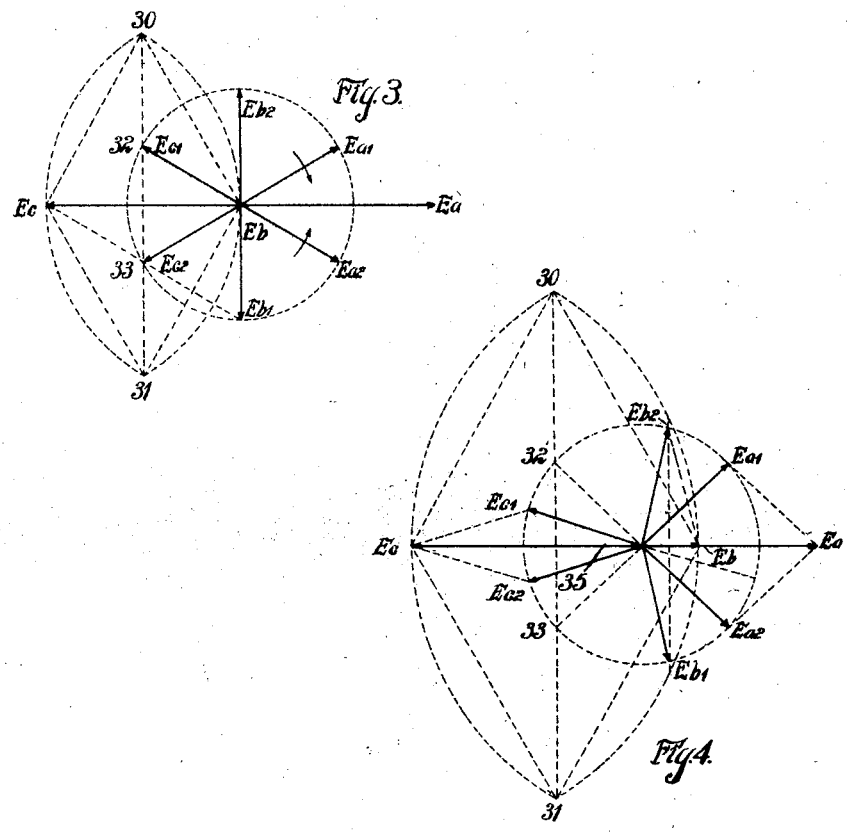
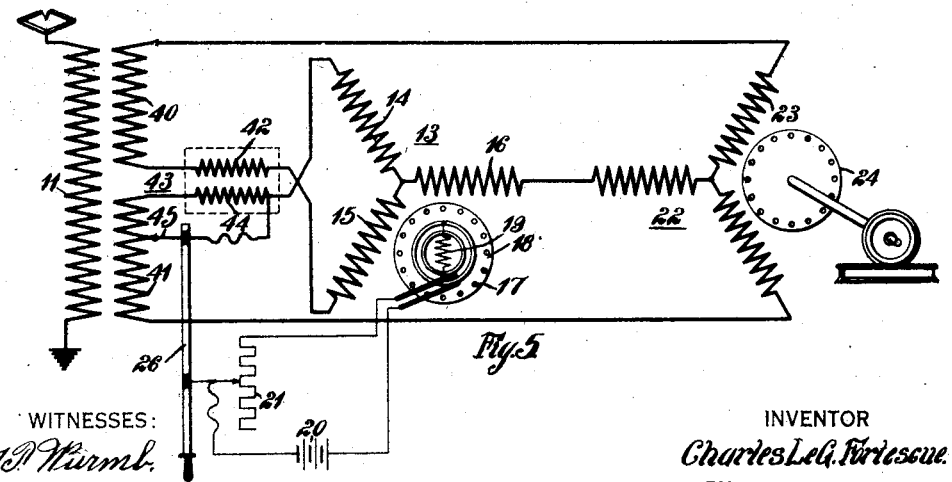
WITNESSES:　　　　　　　　　　　　　　　　　　　　　INVENTOR
　　　　　　　　　　　　　　　　　　　　　　Charles Le G. Fortescue.
　　　　　　　　　　　　　　　　　　　　　　　　BY
　　　　　　　　　　　　　　　　　　　　　　　　　　　　ATTORNEY Patented Jan. 15, 1924.

1,480,711

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

PHASE-CONVERTING SYSTEM.

Application filed November 16, 1918. Serial No. 262,809.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Phase-Converting Systems, of which the following is a specification.

My invention relates to phase-converting systems, more particularly to those of the inherently balanced type, and it has for its object to provide a system of the character designated that shall permit the adjustment of the output voltage in a simple and effective manner.

Figure 1:
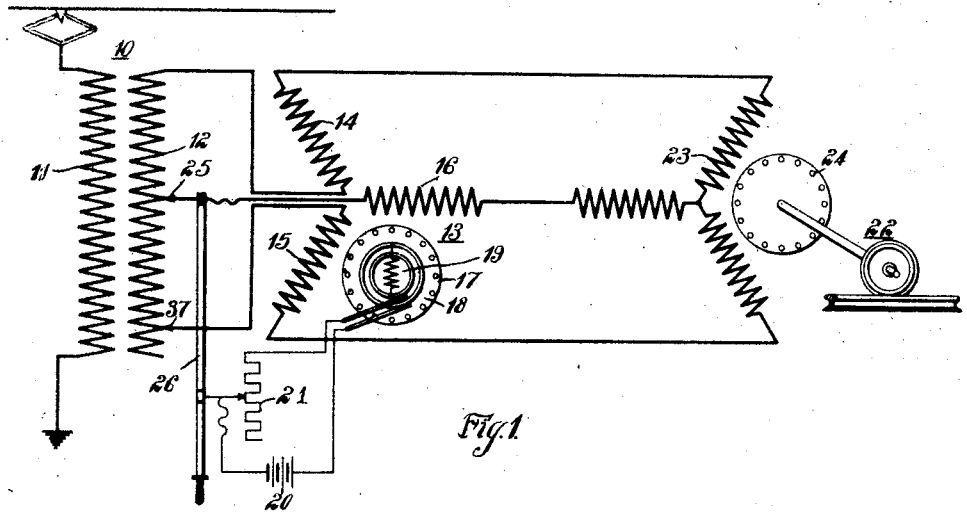
Figure 2:
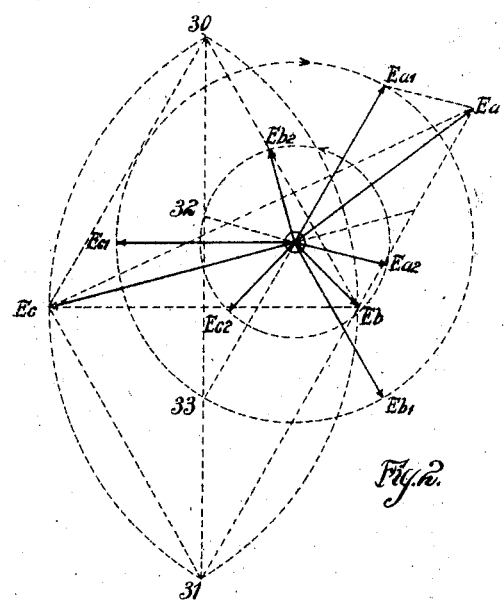

In the accompanying drawing, Fig. 1 is a diagrammatic view of a phase-converting system embodying a preferred form of my invention; Figs. 2, 3 and 4 are vector diagrams explanatory of the operation of the system of Fig. 1; and Fig. 5 is a view similar to Fig. 1 and illustrating a modification of my invention.

In my copending application, Serial No. 206,932, filed Dec. 13, 1917, and assigned to the Westinghouse Electric & Manufacturing Company, I describe and claim a phase-converting system wherein a source of single-phase alternating currents is connected to a polyphase load circuit through a polyphase converting machine, the latter operating to suppress one of the polyphase components of electromotive force into which said single-phase source is resolvable, leaving the remaining polyphase component for application to said load circuit. The arrangement is such that the phase-sequence of this residual polyphase component is the same as that of the impedance drops within the converting machine, whereby the output voltages of the converting machine remain balanced under all conditions of load, with appropriate secondary excitation in the converting machine.

As shown, the field winding of the converting machine in this copending application is divided into three distinct parts or phase-divisions, two of these being connected directly between the terminals of the single-phase source and appropriate terminals of the polyphase load circuit and the third division being connected between the midpoint of the single-phase source and another load terminal. With this connection and with a given effective single-phase supply voltage, but a single polyphase value of balanced electromotive forces is available for supply to the load circuit. I find, however, that, if said point of attachment at the middle of the single-phase source be shifted, or if, in any other manner, the relative magnitude of the two portions, into which the single-phase source is internally divided by the third tap, be adjusted, the magnitude of the two polyphase components into which the single-phase supply electromotive force is resolvable may be adjusted. By appropriate change in the field excitation of the converting machine so that the suppressing effect thereof is properly modified to effectually suppress the undesired polyphase components, the remaining polyphase components may be adjusted in value, as desired, by the conditions of the load circuit.

In an additional copending application, Serial No. 206,921, filed December 13, 1917, by Lewis W. Chubb and assigned to the Westinghouse Electric & Manufacturing Company, is disclosed and claimed a modification of my above-described converting system wherein the single-phase supply winding is split into two parts, rather than rendering the different portions of the field winding of the converting machine conductively distinct. With apparatus of this character, a similar adjustment of the output voltages may be secured by dynamically interlinking the two portions of the supply-transformer winding through an auxiliary transformer and by so arranging the connections thereof that a diminution of the active turns in one winding section will produce a corresponding boost in the voltage of the other winding section and vice versa, all as will hereinafter more fully appear.

Referring to Figs. 1 to 4, inclusive, of the drawing for a more detailed understanding of my invention, I show a source of single-phase supply at 10 such, for example, as a single-phase transformer comprising a primary winding 11 and a secondary winding 12. A phase-converting machine 13 is provided for deriving polyphase currents from the secondary winding 12 and comprises primary windings 14 and 15 and a tertiary winding 16, these windings being conductively distinct within the machine. A secondary winding 17 of the squirrel-cage type is provided for coaction with the windings 14, and 15 and 16 and is shown mounted on a rotor member 18, as is well known in the art. The rotor member 18 may further be provided with a pole winding 19 adapted for energization from a direct-current source 20 through an adjustable resistor 21.

A polyphase load circuit, such, for example, as a railway propulsion motor of the induction type is shown at 22 and comprises a primary winding 23 and a secondary winding 24.

The outer terminals of the secondary winding 12 are connected to two terminals of the winding 23 through the primary windings 14 and 15 of the machine 13, respectively, and an intermediate point 25 of the winding 12 is connected through the tertiary winding 16 to the remaining terminal of the winding 23. The point of attachment 25 may be shifted along the winding 12, as indicated, and, preferably, this shifting should be accompanied by like adjustment of the resistor 21, a common operating rod 26 being shown for performing this function, although, obviously, any type of interlocking, either mechanical or electrical, might be provided for obtaining this result.

Having thus described the arrangement of a system embodying my invention, the operation thereof is as follows. It is first desirable to briefly digress and discuss the well-known proposition that any unbalanced polyphase system of electromotive forces may be resolved into two balanced systems of polyphase electromotive forces having the opposite phase sequence. This proposition is fully discussed in a paper by the applicant and R. E. Gilman appearing on pages 28 et seq. of the "Electric Journal" for January, 1917, but a convenient graphic construction, in accordance with the proposition, is illustrated in Fig. 2. Assume a system of unbalanced three-phase vectors $OE_a$, $OE_b$ and $OE_c$, taking the neutral point O as the centroid of the distorted triangle $E_a$, $E_b$, $E_c$, and let it be desired to graphically construct vectors representing the two balanced systems of opposite phase sequence into which these two vectors may be resolved. Construct the equilateral triangles $E_bE_c30$ and $E_bE_c31$ upon the base $E_bE_c$ of the given distorted triangle. The centroids or points of intersection of the medians of these two equilateral triangles lie at 32 and 33, respectively, the point O being the centroid of the given unbalanced polyphase triangle. Employing the distances O—32 and O—33 as radii, construct the circles shown and, since the desired balanced vectors are to have a mutual phase displacement of 120°, subdivide the circumferences of the circles just drawn into six parts, starting from the centroid points 32 and 33, respectively. The vectors $E_{a1}$ and $E_{a2}$, which are 180° displaced from O—33 and O—32 respectively, are then the components of the vector $E_a$ and, in like manner, the vectors $E_{b1}$ and $E_{b2}$ constitute the components of the vector $E_b$ and the vectors $E_{c1}$ and $E_{c2}$ constitute the components of the vector $E_c$. The vectors $E_{a1}$, $E_{b1}$ and $E_{c1}$ constitute a balanced polyphase system having a clockwise phase-sequence and the vectors $E_{a2}$, $E_{b2}$ and $E_{c2}$ constitute a balanced polyphase system having a counter clockwise phase-sequence.

It is well known that a single-phase electromotive force is the extreme or limiting case of an unbalanced polyphase system or, in other words, a single-phase function is the special case of pure unbalance of a polyphase function. From a graphic standpoint, it may be considered that a single-phase electromotive force would be represented in Fig. 2 by swinging the point $E_a$ downward until it lay in the same straight line with the points $E_b$ and $E_c$, this straight line representing the single-phase function.

Turning to Fig. 3, it will be noted that the foregoing operation has been carried out, the points $E_a$, $E_b$ and $E_c$ lying in the same straight line, the point $E_b$, however, lying midway between the two remaining points.

Applying a strictly analogous geometrical construction to that employed in Fig. 2, two auxiliary centroid points are determined as before and, since the point $E_b$ is the centroid of the hypothetical collapsed triangle, it follows that the radii of the two circles to be constructed are the same, namely, $E_b32$ and $E_b33$. Drawing in the resultant balanced vector systems, there results the well known figure for the resolution of a single-phase electromotive force into two equal systems of polyphase electromotive forces having the opposite phase-sequence, this vector diagram representing the resultant electromotive forces of the system of applicant's abovementioned application, the fact that the connection is made to the mid-point of the single-phase supply winding causing the point $E_b$ to be located midway between the points $E_a$ and $E_c$, as shown.

Let it now be assumed that the point $E_b$ is moved to the right, as indicated in Fig. 4, this effect being produced by the upward movement of the tap 25 in the system of Fig. 1 and being entirely legitimate from an analytical standpoint, as the general case of the collapse of an unbalanced polyphase triangle into a straight line would not result in an equi-spaced distribution of the hypothetical vertex points along a straight line. Reverting to Fig. 4, the effect of moving the point $E_b$ to the right from the mid point 35 has been to move the centroid O of the hypothetical unbalanced triangle to the right one-third of the distance that the point $E_b$ has been moved. Constructing the equilateral triangles as before and determining the centroid points 32 and 33, it is found that they are still equal distances from the centroid point O of the hypothetical triangle but that their distance therefrom is greater than in the construction of Fig. 3 or, in other words, the effect of unsymmetrically locating the point $E_b$ has been to increase the diameter of the circles determining the magnitude of the resultant polyphase vector systems. Dividing the circumference of the resultant circle into six parts, starting from the centroid 33 and, similarly, starting from the centroid 32, the vector systems $E_{a_1}$, $E_{b_1}$, $E_{c_1}$ and $E_{a_2}$, $E_{b_2}$ and $E_{c_2}$ are determined as before. The resultant polyphase components are balanced and of opposite phase-sequence, as in the construction of Fig. 3 but of greater magnitude. Particular attention is directed to the fact that this increased magnitude of the resultant polyphase components is secured by the mere dissymmetrical location of point $E_b$, without increasing the distance $E_a$—$E_c$ or, in other words, without increasing the applied single-phase electromotive force. Thus, the effect of moving the intermediate tap point 25 in the system of Fig. 1 away from the true mid-position in either direction is to increase the magnitude of the two components into which the single-phase electromotive force may be resolved. Likewise, any adjustment of the connections whereby the symmetrical location of the tap point 25 is disturbed increases the polyphase electromotive forces, as, for example, by moving one of the outer tap points, as at 37, and, obviously, by suitable adjustment of the phase converting machine there results an increase in the voltage applied to the load 22.

The machine 13 may be considered as opposing its synchronous impedance of high value to the flow of polyphase currents therethrough in response to one system of component electromotive forces but as offering little or no effective impedance to such polyphase currents flowing in response to the other component system of electromotive forces, the connections being such that the operative phase-sequence within the machine 13 is the same as that of the polyphase current permitted to flow therethrough. Thus, the balanced impedance drops at all times coalesce with the balanced electromotive forces impressed through the machine 13, resulting in balanced output voltages thereof, under all conditions of load, assuming that the excitation of the rotor 18 is such that the synchronous impedance of the machine 15 is held at such a value as to exactly suppress the undesired polyphase current.

As above pointed out, the effect of disturbing the symmetry of the three points of attachment to the winding 12 is to increase both systems of polyphase current and, obviously, the suppressing action of the machine 13 may be modified in order to eliminate the enlarged undesired polyphase components and this effect is obtained by increasing the excitation of the field winding 19 through the interlocking of the resistor 21 with the adjustable mid-point 25.

Turning to the system of Fig. 5, which accords with the system of the aforementioned Chubb application, it will be noted that the supply winding is divided into two portions and it is, therefore, difficult to disturb the symmetry of the points of connection of the converter to the supply winding without the use of switching means upon both the upper and lower sub-divisions of the supply winding and the operation of these two sets of switches, together with that of the adjustable resistor for the converter excitation would create an expensive and complicated control system.

I find, however, that, by connecting the upper portion 40 of the supply winding with the converter winding 15 through one winding 42 of an auxiliary transformer 43 and by connecting the lower portion 41 of the supply winding to the converter winding 14 through remaining winding 44 of the transformer 43, the desired effect may be produced. The right-hand terminal of the auxiliary winding 44 is connected to an adjustable tap 45 that may be moved along the supply winding 41 in consonance with the adjustment of the resistor 21 as through a coupling rod 26. The downward movement of the tap point 45 decreases the electromotive force supplied to the converter from the supply winding 41 and, at the same time, the increasing electromotive force impressed between the left-hand terminal of the winding 44 and the tap point 45 boosts the electromotive force of the supply winding 40 through the transformer 43, thus producing the same dissymmetry as is secured by the movement of the point 25 in the system of Fig. 1, without serious complication of the switching system thereof. The suppressing effect of the converter 13 upon the resultant increased polyphase components is the same as that hitherto described.

While I have shown my invention in two desirable forms, it will be obvious to those skilled in the art that it is not so limited but is susceptible of various minor changes and modifications without departing from the spirit thereof and I desire, therefore, that only such limitations shall be placed thereupon as are imposed by the prior art or as are specifically set forth in the appended claims.

I claim as my invention:

1. The combination with a circuit carrying single-phase alternating current resolvable into two component systems of polyphase currents having opposite phase-sequence, of a polyphase circuit, a polyphase dynamo-electric machine so connected to said circuits as to permit the flow of but one polyphase component therebetween, said component having the same phase-sequence as the impedance drops in said dynamo-electric machine, means for supplying said dynamo-electric machine with unidirectional excitation, means for varying the magnitude of said polyphase components, and means for simultaneously adjusting the unidirectional excitation of said dynamo-electric machine, whereby the undesired polyphase component may be eliminated, irrespective of its magnitude.

2. The combination with a single-phase system including a pluraltiy of winding portions of variable electromotive-forces; of a polyphase system; a polyphase induction machine comprising a primary member carrying a primary winding connected in series between said plurality of single-phase winding portions and said polyphase system, and a secondary member carrying a low-impedance, polyaxially short-circuited secondary winding and a direct-current winding, said secondary member rotating with respect to said primary member at synchronous speed corresponding to the generated electromotive-forces in said dynamo-electric machine, whereby said dynamo-electric machine opposes only a low impedance to currents of the same phase-sequence as the drops in said machine; and variable means for exciting said direct-current winding.

3. The combination with a source of single-phase alternating electromotive force, of a polyphase dynamo-electric machine of the induction type provided with non-interconnected primary phase-windings, a polyphase load-circuit, connections from the terminals of said source through two of said primary phase-divisions to two terminals of said load-circuit, a connection from an intermediate point in said source to an additional terminal of said load circuit, said dynamo-electric machine running so as to suppress one of the systems of polyphase electromotive forces into which said single-phase source is resolvable, the phase-sequence of the remaining component polyphase system being the same as that of the impedance drops set up in said dynamo-electric machine by the flow of load currents therethrough, and means for varying the relative magnitudes of the two portions of said determined source by the intermediate tap thereon, whereby the magnitude of the component electromotive force applied to said load circuit may be varied.

4. The combination with a source of single-phase alternating electromotive force, of a polyphase dynamo-electric machine of the induction type provided with non-interconnected primary phase-windings, a polyphase load circuit, connections from the terminals of said source through two of said primary phase-divisions to two terminals of said load-circuit, a connection from an intermediate point in said source to an additional terminal of said load circuit, said dynamo-electric machine running so as to suppress one of the systems of polyphase electromotive forces into which said single-phase source is resolvable, the phase-sequence of the remaining component polyphase system being the same as that of the impedance drops set up in said dynamo-electric machine by the flow of load currents therethrough, means for varying the relative magnitudes of the two portions of said source determined by the intermediate tap thereon, whereby the magnitude of the component electromotive forces applied to said load circuit may be varied, and means for simultaneously varying the secondary field of said dynamo-electric machine, whereby the undesired polyphase component of electromotive forces may be eliminated, irrespective of its magnitude.

5. The combination with a source of single-phase alternating electromotive force, of a three-phase dynamo-electric machine of the induction type provided with non-interconnected primary phase-windings, a three-phase load circuit, connections from the terminals of said source through two of said primary phase-divisions to two terminals of said load circuit, a connection from an intermediate point in said source through another primary phase-division of said dynamo-electric machine to an additional terminal of said load circuit, said dynamo-electric machine running so as to suppress one of the systems of three-phase electromotive forces into which said single-phase source is resolvable, the phase-sequence of the remaining component three-phase system being the same as that of the impedance drops set up in said dynamo-electric machine by the flow of load currents therethrough, and means for varying the relative magnitudes of the two portions of said source determined by the three taps thereon, whereby the magnitude of the component electromotive forces applied to said load circuit may be varied.

6. The combination with a source of single-phase alternating electromotive force, of a three-phase dynamo-electric machine of the induction type provided with non-interconnected primary phase-windings, a three-phase load circuit, connections from the terminals of said source through two of said primary phase-divisions to two terminals of said load-circuit, a connection from an intermediate point in said source through another primary phase-division of said dynamo-electric machine to an additional terminal of said load circuit, said dynamo-electric machine running so as to suppress one of the systems of polyphase electromotive forces into which said single-phase source is resolvable, the phase-sequence of the remaining component three-phase system being the same as that of the impedance drops set up in said dynamo-electric machine by the flow of load currents therethrough, means for varying the relative magnitudes of the two portions of said source by the three taps thereon, whereby the magnitude of the component electromotive forces applied to said load circuit may be varied, and means for simultaneously varying the secondary field of said dynamo-electric machine, whereby the undesired polyphase component of electromotive forces may be eliminated, irrespective of its magnitude.

7. The method of deriving a variable polyphase electromotive force from an unvarying source of single-phase alternating-current electromotive force by a three-point connection thereto, corresponding to the three vertices of a collapsed polyphase triangle, which comprises adjusting the relative magnitude of the two adjacent segments of said source embraced and determined by said three points of attachment thereto, without altering the sum of said segments, and suppressing one of the component polyphase electromotive forces into which said single-phase electromotive force is resolvable.

8. The method of deriving an adjustable polyphase electromotive force from a source of single-phase alternating-current electromotive force by a three-point connection thereto, corresponding to the three vertices of a collapsed polyphase triangle, which comprises adjusting the relative magnitude of the two adjacent segments of said source embraced and determined by said three points of attachment thereto, and suppressing one of the component polyphase electromotive forces into which said single-phase electromotive force is resolvable.

9. The method of operating a phase-converting system embodying a source of single-phase alternating-current electromotive force, a dynamo-electric phase-converter and a polyphase load, said phase-converter operating to eliminate one of the polyphase components into which said single-phase electromotive force is resolvable, which comprises altering the magnitude of the polyphase components of said single-phase electromotive force and correspondingly modifying the supressing action of said converter so as to suppress the modified undesirable polyphase component.

10. In a phase-converting system, the combination with a source of single-phase alternating-current electromotive force divided into two portions corresponding to the two shorter sides of a collapsed polyphase triangle of electromotive forces, of means for suppressing one of the polyphase component electromotive forces into which said single-phase electromotive force is resolvable, and means for adjusting the relative magnitude of said portions, whereby the magnitude of the remaining and useful polyphase component of electromotive force is altered.

11. The combination with a single phase system, of a polyphase system, a synchonous phase converter connected in series therebetween, means for increasing the voltage of said polyphase system with respect to said single phase system, and means for simultaneously varying the excitation of said phase converter.

12. The method of utilizing a line having a plurality of phases or circuits between line conductors and having two balanced systems of component polyphase electromotive forces having opposite phase sequences, to which is serially connected a polyphase synchronous machine opposing its synchronous impedance of high value to the flow of polyphase currents therethrough in response to one of said systems of component electromotive forces but offering a relatively small impedance to the flow of polyphase currents in response to the other of said systems, said method consisting in adjusting the excitation of said synchronous machine to substantially the proper value to cause the machine to generate an electromotive force equal to said first-mentioned component system of electromotive forces.

13. The method of utilizing a dynamo-electric machine having a unidirectional-current exciting winding and a damper winding in connection with a line having a plurality of component electromotive forces tending to cause said machine to operate at different synchronous speeds, whereby said machine can be in synchronism with only one of said component electromotive forces at a time, said machine being connected in series with said line and operating at a synchronous speed corresponding to an undesired component of electromotive force, said method consisting in adjusting the unidirectional excitating flux thereof to substantially the proper value to generate an electromotive force, resulting from the rotation of said machine, equal to said undesired component.

14. An electrical system including, in combination, a three-phase translating device, two single-phase translating devices, said single-phase devices developing electromotive forces of the same frequency, a three-phase dynamo-electric machine having a damper winding, connections for connecting said three phase machine in series circuit relation between said three-phase translating device and said single-phase translating devices, said connections being made in such manner that said single-phase electromotive forces are in the proper directions for combining with the three-phase electromotive forces of said machine to produce a resultant three-phase electromotive force having the opposite phase-sequence, and means for varying the ratio between said single-phase electromotive forces.

15. An electrical system including, in combination, a three-phase translating device, a single-phase transformer including two winding elements, a three-phase dynamo-electric machine having a damper winding, connections for connecting said three-phase machine in series circuit relation between said three-phase translating device and said single-phase winding elements, said connections being made in such manner that the single-phase electromotive forces are in the proper directions for combining with the three-phase electromotive forces of said machine to produce a resultant three-phase electromotive force having the opposite phase-sequence, and means for varying the ratio between said single-phase electromotive forces.

16. An electrical system including, in combination, a three-phase translating device, a single-phase transformer winding provided with three taps dividing the same into two winding elements, a dynamo-electric machine having non-interconnected three-phase primary windings and a damper winding, connections for connecting the three primary windings severally in series circuit relation between the respective transformer taps and the three-phase translating device, and means for shifting the intermediate transformer tap.

17. An electrical system including, in combination, a three-phase translating device, two single-phase translating devices, said single-phase devices developing electromotive forces of the same frequency, a three-phase dynamo-electric machine having a damper winding, connections for connecting said three-phase machine in series circuit relation between said three-phase translating device and said single-phase translating devices, said connections being made in such manner that said single-phase electromotive forces are in the proper directions for combining with the three-phase electromotive forces of said machine to produce a resultant three-phase electromotive force having the opposite phase-sequence, unidirectional exciting means for said three-phase machine, and means for simultaneously varying said exciting means and the ratio between said single-phase electromotive forces.

18. An electrical system including, in combination, a three-phase translating device, a single-phase transformer including two winding elements, a three-phase dynamo-electric machine having a damper winding, connections for connecting said three-phase machine in series circuit relation between said three-phase translating device and said single-phase winding elements, said connections being made in such manner that the single-phase electromotive forces are in the proper directions for combining with the three-phase electromotive forces of said machine to produce a resultant three-phase electromotive force having the opposite phase-sequence, unidirectional exciting means for said three-phase machine, and means for simultaneously varying said exciting means and the ratio between said single-phase electromotive forces.

19. An electrical system including, in combination, a three-phase translating device, a single-phase transformer winding provided with three taps dividing the same into two winding elements, a dynamo-electric machine having non-interconnected three-phase primary windings and a damper winding, connections for connecting the three primary windings severally in series circuit relation between the respective transformer taps and the three-phase translating device, unidirectional exciting means for said three-phase machine, means for shifting the intermediate transformer tap, and means for simultaneously varying said exciting means.

20. The method of operating an electrical converting system for interconnecting a three-phase line, through a series phase-balancer, to a single-phase translating device having two component single-phase electromotive forces, said method comprising the step of varying the ratio between said component single-phase electromotive forces.

21. The method of operating an electrical converting system for interconnecting a three-phase line, through a series synchronous phase-balancer, to a single-phase translating device having two component single-phase electromotive forces, said method comprising the step of varying the ratio between said component single-phase electromotive forces and simultaneously varying the unidirectional excitation of said synchronous phase-balancer.

22. The method of operating a series synchronous phase-balancer to substantially prevent the flow of reverse phase-sequence currents in an unbalanced three-phase line, which consists in adjusting the unidirectional excitation of the balancer in accordance with the magnitude of the reverse phase-sequence symmetrical component voltage of the unbalanced line.

In testimony whereof, I have hereunto subscribed my name this 30th day of Oct. 1918.

CHARLES LE G. FORTESCUE.